UNITED STATES PATENT OFFICE.

JAMES SIMPSON, OF LIVERPOOL, ENGLAND.

PROCESS OF MAKING CAUSTIC SODA.

SPECIFICATION forming part of Letters Patent No. 462,366, dated November 3, 1891.

Application filed July 10, 1891. Serial No. 399,044. (No specimens.) Patented in England November 21, 1890, No. 18,835.

*To all whom it may concern:*

Be it known that I, JAMES SIMPSON, a subject of the Queen of Great Britain, and a resident of Liverpool, in the county of Lancaster, England, have invented a new and useful Improvement in the Manufacture of Caustic Soda, with the recovery of reagents employed for repeated use, (for which I have obtained a patent in Great Britain, No. 18,835, dated November 21, 1890,) of which the following is a specification.

The object of my invention is in a cheap and efficient manner to manufacture caustic soda without the use of any expensive reagent, and at the same time to recover hydrochloric acid in a condition suitable for repeated use or sale or for the manufacture of any desired chlorine product.

I find as a result of an exhaustive series of experiments that there are three methods by which the object of my invention can be attained.

The first method is as follows: A. Tricalcic phosphate is treated with just sufficient hydrochloric acid (preferably diluted to about 10° Twaddle) to completely dissolve it. This solution may be assumed to be a mixture of chloride of calcium and phosphoric acid. B. To the solution thus produced in the cold, neutral sulphate of soda is added, preferably in solution, in proportions equivalent to the chloride of calcium, whereby sulphate of lime is precipitated, and a solution which is probably a mixture of chloride of sodium and phosphoric acid is formed. C. The supernatant liquor is drawn off from the precipitated sulphate of lime and concentrated by boiling in vessels of suitable material, such as wood lined with some acid-resisting material, the charge being preferably heated by a steam-coil. During this concentration the greater part of the sulphate of lime remaining in the solution is precipitated and can be removed. During this concentration hydrochloric acid is evolved, at first weak, but gradually increasing in strength, and may be caught in condensing-towers of any well-known and suitable design. D. When the solution has been concentrated so far as to become thick or pasty, it is run into a silica-lined muffle-furnace with a low crown and subjected to a red heat—say 800° to 1,000° Fahrenheit, or thereabout—when strong hydrochloric acid will be evolved and may be caught in condensing-towers as required. E. The fused mass resulting from this operation is tapped off while in the molten state and is run into water, when it disintegrates into a finely-divided condition, specially suitable for dissolving, and is then dissolved. The above-mentioned mass (consisting, principally, of phosphate of soda) will also contain a proportion of chloride of sodium. F. The solution of phosphate of soda and chloride of sodium is brought to a density of about 60° to 70° Twaddle and left to settle, when the two salts are separated by the ordinary process of "salting out," the less soluble salt crystallizing out, while the other remains in solution. G. The phosphate of soda resulting from the preceding operation is made into a solution of about 26° Twaddle and is agitated with caustic lime at about boiling-point, when phosphate of lime is precipitated and caustic soda remains in solution. H. The phosphate of lime can be again dissolved in hydrochloric acid for the first operation, (A,) or it can be sold for the manufacture of manure, phosphate of lime from some other source (preferably dicalcic) being employed to replace it.

The caustic-soda solution can be used for soap-making, paper-making, or for any other desired purpose, or can be boiled down, fused, and packed in iron drums, for sale, as customary.

The second method is as follows: In all respects the process is identical with the first, except that bisulphate of soda is used in operation B instead of neutral sulphate. By this means the chloride of sodium found mixed with the fused phosphate of soda in operation E is reduced to a minimum; but a somewhat larger proportion of sulphate of lime will be carried forward from operation B to the solution of phosphate of soda in operation G. The said sulphate of lime, however, is almost entirely eliminated in the causticizing operation by being carried down with the precipitated phosphate of lime, and any small amount of the said sulphate that may still remain in the causticized liquor will come out as "bottoms" when the caustic is fused.

The third method is as follows: Instead of using tricalcic phosphate in operation. A of the first method, I use dicalcic phosphate, whereby the use of bisulphate of soda, as in the second method, is obviated and the chloride of sodium remaining in the solution to be causticized is reduced to a minimum. The dicalcic phosphate may be obtained for repeated use by conducting the causticizing operation in the following manner: Add the lime (preferably as milk of lime) carefully in order to avoid having any excess of lime, so as to leave a little phosphoric acid in the solution. Draw off the latter, when the precipitate will be found to be in the dicalcic condition. The solution of caustic soda containing a small percentage of phosphoric acid is then treated with an excess of lime, when caustic soda practically free from phosphoric acid will be obtained and can be drawn off. The insoluble phosphate of lime will contain some free lime, but this will be available for the succeeding causticizing operation. Dicalcic phosphate can also be obtained by dissolving tricalcic phosphate in hydrochloric acid, preferably diluted to about 10° Twaddle and treating with lime in the same manner as described for the causticizing operation.

A certain amount of phosphoric acid will be carried off by the precipitated sulphate of lime; but most of this can be removed by washing. If sufficiently rich in phosphoric acid, the sulphate of lime may be sold as manure; but if not rich enough for this purpose it may be roasted with carbonaceous matter in a revolving black-ash furnace and converted into sulphide of calcium. The sulphide of calcium can then be made into sulphydrate of calcium by passing sulphureted hydrogen under pressure through an aqueous mixture of the said sulphide of calcium in a series of vessels, such as are used in the Solvay, Chance, and other processes for treating aqueous mixtures with gases. The insoluble phosphate of lime remaining in the sulphydrate will subside, and may be recovered by decanting off the sulphydrate solution.

It is manifest that if the phosphate of lime which is precipitated in the causticizing operation be again dissolved in the hydrochloric acid which is given off in the concentration and fusion operations C and D and these reactions are operated repeatedly there will be very little risk of impurities being introduced into the process, as the only raw materials required to produce the caustic soda are sulphate of soda and lime, the result being that caustic soda of very high strength and purity is obtained at a very low cost.

In practical working I find that the following proportions of raw materials and reagents give satisfactory results, the calculation being based on the quantities required to produce one ton of caustic soda:

*First method.*

|  | T. | Cwt. | Qrs. |  |
|---|---|---|---|---|
| Tricalcic phosphate containing | 1 | 6 | 0 | of phosphoric acid. |
| Sulphate of soda, neutral | 3 | 7 | 0 |  |
| Hydrochloric acid=28° Tw | 8 | 7 | 0 | diluted to about 10° T. before use. |
| Lime | 1 | 19 | 0 |  |

*Second method.*

|  | T. | Cwt. | Qrs. |  |
|---|---|---|---|---|
| Tricalcic phosphate containing | 1 | 10 | 0 | of phosphoric acid. |
| Bisulphate of soda | 3 | 10 | 0 |  |
| Hydrochloric acid=28° Tw | 9 | 17 | 0 | diluted to about 10° T. before use. |
| Lime | 1 | 19 | 0 |  |

*Third method.*

|  | T. | Cwt. | Qrs. |  |
|---|---|---|---|---|
| Dicalcic phosphate containing | 1 | 0 | 0 | of phosphoric acid. |
| Sulphate of soda, neutral | 2 | 1 | 0 |  |
| Hydrochloric acid=28° Tw | 4 | 14 | 0 | diluted to about 10° T. before use. |
| Lime | 1 | 19 | 0 |  |

I claim—

1. The process of manufacturing caustic soda, consisting in treating calcic phosphate with hydrochloric acid, adding to this solution sulphate of soda, separating the precipitated sulphate of lime from the solution, and transforming the sodium of the solution into caustic soda, substantially as described.

2. The process of manufacturing caustic soda, consisting in treating calcic phosphate with hydrochloric acid, adding to this solution sulphate of soda, drawing off the liquor and concentrating the same, separating the phosphate of soda and chloride of sodium of the concentrate, and transforming the phosphate of soda into caustic soda, substantially as described.

3. The process of manufacturing caustic soda, consisting in treating calcic phosphate with hydrochloric acid, adding to this solution sulphate of soda, drawing off the liquor and concentrating the same, subjecting the concentrated mass to a red heat and fusing the same, dissolving the fused mass, separating the phosphate of soda and chloride of sodium contained in the solution, treating the phosphate of soda with caustic lime, and separating the phosphate of lime and caustic soda resulting, substantially as and for the purposes described.

4. The process of manufacturing caustic soda, consisting in treating calcic phosphate with hydrochloric acid, adding to this solution sulphate of soda, drawing off the liquor and concentrating the same, subjecting the concentrated mass to a red heat and fusing the same, collecting the hydrochloric acid evolved in the steps of concentrating and fusing, dissolving the fused mass, separating the phosphate of soda and chloride of sodium contained in the solution, treating the phosphate of soda with caustic lime, and separating the phosphate of lime and caustic soda resulting, substantially as and for the purposes described.

JAMES SIMPSON.

Witnesses:
CHARLES COLLINS,
JNO. GROCOBB.